US012555352B2

(12) United States Patent
Yu et al.

(10) Patent No.: US 12,555,352 B2
(45) Date of Patent: Feb. 17, 2026

(54) MOTIF-BASED IMAGE CLASSIFICATION

(71) Applicant: Home Depot Product Authority, LLC, Atlanta, GA (US)

(72) Inventors: Aron Yu, Round Rock, TX (US); Estelle Afshar, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 660 days.

(21) Appl. No.: 17/889,752

(22) Filed: Aug. 17, 2022

(65) Prior Publication Data
US 2023/0057167 A1 Feb. 23, 2023

Related U.S. Application Data

(60) Provisional application No. 63/234,688, filed on Aug. 18, 2021.

(51) Int. Cl.
*G06V 10/74* (2022.01)
*G06V 10/774* (2022.01)
*G06V 10/94* (2022.01)
*G06V 20/70* (2022.01)
*G06V 30/413* (2022.01)

(52) U.S. Cl.
CPC .......... *G06V 10/761* (2022.01); *G06V 10/774* (2022.01); *G06V 10/945* (2022.01); *G06V 20/70* (2022.01); *G06V 30/413* (2022.01)

(58) Field of Classification Search
CPC .... G06V 30/413; G06V 20/70; G06V 10/761; G06V 10/945; G06V 10/70; G06V 10/72; G06V 30/418–42
See application file for complete search history.

(56) References Cited

U.S. PATENT DOCUMENTS

| | | | |
|---|---|---|---|
| 5,982,932 A * | 11/1999 | Prokoski | G06V 10/7515 382/224 |
| 8,942,487 B1 * | 1/2015 | Baluja | H04N 19/105 382/224 |
| 2015/0055854 A1 * | 2/2015 | Marchesotti | G06F 18/2178 382/159 |
| 2015/0294191 A1 * | 10/2015 | Zhang | G06T 7/0002 382/160 |
| 2016/0078359 A1 | 3/2016 | Csurka et al. | |

(Continued)

OTHER PUBLICATIONS

J. Yang et al., "Hierarchical Feature Embedding for Attribute Recognition," 2020 IEEE/CVF Conference on Computer Vision and Pattern Recognition (CVPR), Seattle, WA, USA, 2020, pp. 13052-13061, doi: 10.1109/CVPR42600.2020.01307 (Year: 2020).*

(Continued)

*Primary Examiner* — Utpal D Shah
*Assistant Examiner* — Jack Peter Kraynak
(74) *Attorney, Agent, or Firm* — Greenberg Traurig, LLP

(57) ABSTRACT

A method for displaying images similar to a selected image includes receiving, from a user, a selection of an anchor image, generating, using a machine learning model, an anchor embeddings set for the anchor image and respective candidate embeddings sets for a plurality of candidate images. The method also includes calculating a distance between the anchor embeddings set and each of the plurality of candidate embeddings sets and displaying at least one of the plurality of candidate images based on the calculated distance.

18 Claims, 6 Drawing Sheets

(56) References Cited

U.S. PATENT DOCUMENTS

| | | | |
|---|---|---|---|
| 2016/0252346 A1 | 9/2016 | Bismuth et al. | |
| 2020/0118314 A1* | 4/2020 | Ranzinger | G06F 16/56 |
| 2020/0210763 A1* | 7/2020 | Lin | G06F 18/2148 |
| 2020/0285944 A1* | 9/2020 | Lee | G06F 18/24 |
| 2020/0372073 A1* | 11/2020 | Dahl | G06V 10/82 |
| 2021/0089827 A1* | 3/2021 | Kumagai | G06F 18/2148 |
| 2021/0271707 A1* | 9/2021 | Lin | G06F 40/216 |
| 2022/0383037 A1* | 12/2022 | Pham | G06F 18/25 |

OTHER PUBLICATIONS

Pondenkandath, V., Alberti, M., Eichenberger, N., Ingold, R., & Liwicki, M. (2020). Cross-Depicted Historical Motif Categorization and Retrieval with Deep Learning. Journal of imaging, 6(7), 71. https://doi.org/10.3390/jimaging6070071 (Year: 2020).*

ISA/US, ISR/WO issued in Appl. No. PCT/US2022/40695, date of mailing Nov. 16, 2022, 14 pgs.

Akiba et al., Optuna: A Next-Generation Hyperparameter Optimization Framework. In ACM SIGKDD International Conference on Knowledge Discovery and Data Mining, Aug. 2019, 23 pp.

Badriyah et al., Recommendation system for property search using content based filtering method. 2018 International conference on information and communications technology (ICOIACT). IEEE, 2018, 5 pp.

Deng et al., ImageNet: A Large-Scale Hierarchical Image Database. In IEEE Conference on Computer Vision and Pattern Recognition, Jun. 2009, 8 pp.

Dubey, A Decade Survey of Content Based Image Retrieval using Deep Learning. IEEE Transactions on Circuits and Systems for Video Technology, 2021, 17 pp.

El-Haija et al., YouTube-8M: A Large-Scale Video Classification Benchmark. CoRR, abs/1609.08675, 2016.

Everingham et al., The PASCAL Visual Object Classes Challenge 2012 (VOC2012) Results. http://www.pascalnetwork.org/challenges/VOC/voc2012/workshop/index.html.

He et al., Deep Residual Learning for Image Recognition. In IEEE Conference on Computer Vision and Pattern Recognition, Jun. 2016, 9 pp.

He et al., Neural collaborative filtering. In Proceedings of the 26th international conference on world wide web, Apr. 2017, pp. 173-182.

Karpathy et al., Large-Scale Video Classification with Convolutional Neural Networks. In IEEE Conference on Computer Vision and Pattern Recognition, Jun. 2014, 8 pp.

Khosla et al., Novel Dataset for Fine-Grained Image Categorization. In Workshop on Fine-Grained Visual Categorization at IEEE Conference on Computer Vision and Pattern Recognition, Jun. 2011, 2 pp.

Kiapour et al., Where to Buy It: Matching Street Clothing Photos in Online Shops. In IEEE International Conference on Computer Vision, Dec. 2015, 9 pp.

Latif et al., Content-Based Image Retrieval and Feature Extraction: A Comprehensive Review. Mathematical Problems in Engineering, 2019, 22 pp.

Lin et al. Microsoft coco: Common objects in context. Computer Vision—ECCV 2014: 13th European Conference, Zurich, Switzerland, Sep. 6-12, 2014, Proceedings, Part V 13. Springer International Publishing, 2014, 15 pp.

Shankar et al., Deep learning based large scale visual recommendation and search for e-commerce. arXiv preprint arXiv:1703.02344 (2017), 9 pp.

Su et al., A survey of collaborative filtering techniques. Advances in artificial intelligence 2009, 20 pp.

Wang et al., Contextual Visual Similarity. CoRR, 2016. https://arxiv.org/abs/1612.02534v1, 9 pp.

Wang et al., Learning Fine-Grained Image Similarity with Deep Ranking. In IEEE Conference on Computer Vision and Pattern Recognition, Jun. 2014, 8 pp.

Wang et al., Neural Graph Collaborative Filtering. In ACM SIGIR Conference on Research and Development in Information Retrieval, Jul. 2019, 10 pp.

Xu et al. Content-based recommendation in e-commerce. International Conference on Computational Science and Its Applications. Berlin, Heidelberg: Springer Berlin Heidelberg, 2005, 10 pp.

Xu et al., A Scalable Framework for Product Image Classification applied to Home Improvement E-commerce. In Workshop on Deep Learning Practice for High-Dimensional Sparse Data at ACM SIGKDD Knowledge Discovery and Data Mining, Aug. 2021, 10 pp.

Yu et al., Fine-Grained Visual Comparisons with Local Learning. In IEEE Conference on Computer Vision and Pattern Recognition, Jun. 2014, 8 pp.

Yu et al., Just Noticeable Differences in Visual Attributes. In IEEE International Conference on Computer Vision, Dec. 2015, 9 pp.

* cited by examiner

MOTIF-BASED IMAGE CLASSIFICATION

CROSS-REFERENCE TO RELATED APPLICATION

This application is a non-provisional conversion of U.S. Pat. App. No. 63/234,688 entitled "MOTIF-BASED IMAGE CLASSIFICATION," filed Aug. 18, 2021, which is hereby incorporated by reference in its entirety.

FIELD OF THE DISCLOSURE

The present disclosure generally relates to image classification techniques for determining visually similar objects in images based on visual motifs.

DETAILED DESCRIPTION

Image classification techniques are typically used to determine the category or categories to which an input image belongs. For example, convolutional neural networks (CNNs) for images include a series of layers that calculate kernel convolutions on pixel data to detect edges, corners, and shapes within an image, which may be used to classify the image. A typical CNN training process involves providing a set of labeled image samples to the CNN, comparing the predicted category for each data sample to its label, and tuning the weights of the CNN to better predict each data sample's label.

While image classifiers such as traditional CNNs are effective in some contexts, known image classifiers are not robust as to subjective qualities, such as "style." Human observers often categorize certain items, such as paintings, furniture, decorations, and the like, according to subjective stylistic classifications that are not rigidly defined. An improved image classifier can classify images of such objects according to generally subjective stylistic categories, using a machine learning based classifier trained to recognize stylistic motifs.

In some embodiments, an image classifier according to the present disclosure may find use in e-commerce, such as to recognize a style of a product and to recommend similar products, or coordinating products, to the user. For example, a user may select a product on an e-commerce website (an anchor product), and the e-commerce system may determine the style of the anchor product and recommend one or more replacement or coordinating products of a similar style. Such an e-commerce system, however, is merely one example implementation of the present disclosure.

Figure 1:
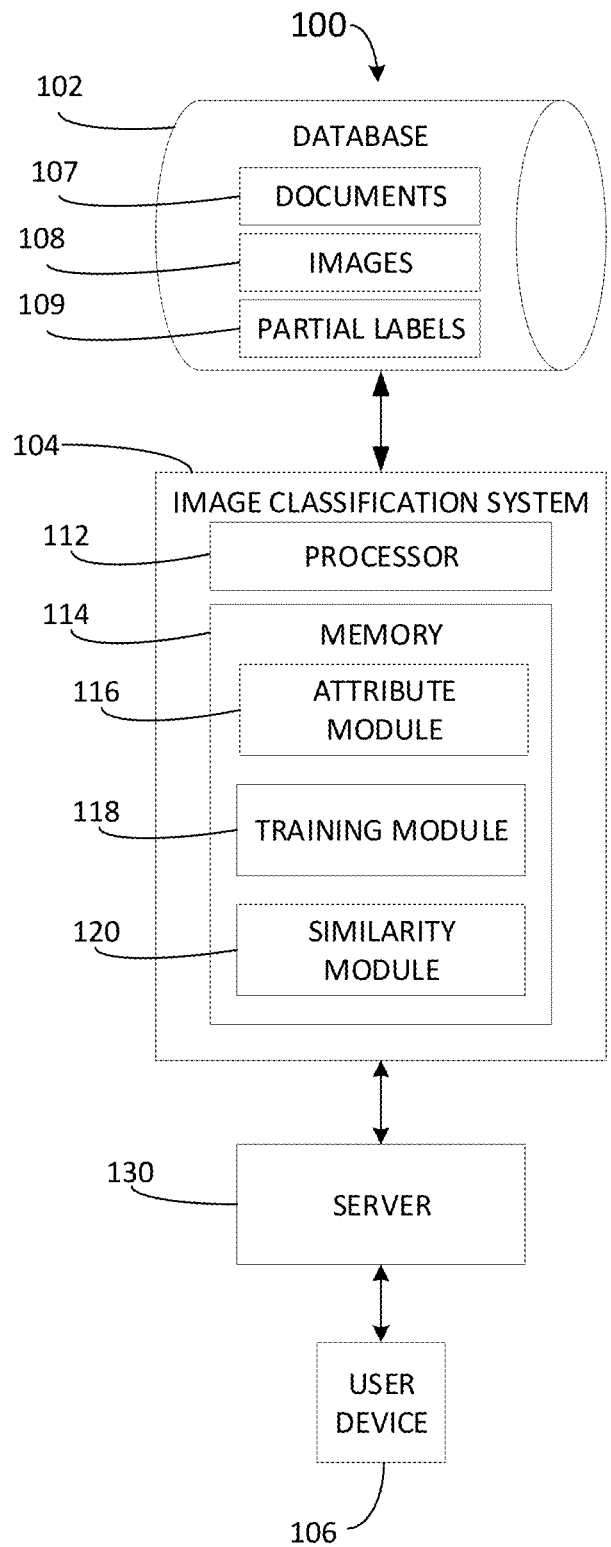
FIG. 1 is a block diagram illustrating an example system for determining similar images based on visual motifs.

Referring to the drawings, wherein like numerals refer to the same or similar features in the various views, FIG. 1 is a block diagram illustrating an example classification system 100 for classifying images and determining an extent to which two images are visually similar. The system 100 may include a data source 102, an image classification system 104, a server 130, and a user computing device 106.

The data source 102 may include a plurality of documents 107, a plurality of images 108, and a plurality of partial labels 109. The documents 107 may be documents specific to or otherwise accessible through a particular electronic user interface, such as a website or mobile application. For example, each document 107 may be an item information page respective of a particular item. The images 108 may include images items to which similar styles may apply. Each document may have or be associated with one or more images 108. For example, the images 108 may include a plurality of home décor items of different types. The labels 109 may include a respective one or more classification labels for each of the images 108. The labels 109 may be "partial" in the sense that a given label may not be completely applied across the data set; as a result, the images 108 and partial labels 109 may be considered a "noisy" data set. The terminology reflected in the labels 109 may be non-standardized or inconsistent. For example, a "cream" object in one label may instead be described as "off-white" in another label indicative of the same underlying color. The data source 102 may include documents 107, images 108, and labels 109 of a plurality of categories, in some embodiments, and accordingly machine earning model training may be based on multi-category data.

In addition to receiving data from the data source 102, the image classification system 104 may update the data source 102. For example, the image classification system 104 may push newly-received documents 107 or images 108 to be included within the data source 102, or the image classification system 104 may add, edit, or modify labels 109 that are used by the image classification system 104 (e.g., to train a machine learning algorithm, etc.)

The image classification system 104 may include a processor 112 and a non-transitory, computer readable memory 114 storing instructions that, when executed by the processor 112, cause the processor 112 (and therefore the system 104) to perform one or more processes, methods, algorithms, steps, etc. of this disclosure. For example, the memory 114 may include functional modules 116, 118, and 120.

The functional modules 116, 118, and 120 of the image classification system 104 may include an attribute module 116 configured to generate a set of visual attributes for the image classification system 104 based on the information received from the data source 102. In particular, the attribute module 116 may standardize the labels 109, divide the standardized labels into classes, and flatten the resultant labels and classes to visual attributes (or motifs) that correspond to binary values. For example, label 109 'ruby red' may be standardized to 'red,' classified as 'color,' and flattened to 'color.red.' Combinations of these visual attributes may be thought of as motifs because they may be indicative of characteristics that are significant and are repeated throughout a body of images, much like how a literary motif is a theme that may be symbolically significant and repeated throughout a work. Each motif may be a combination (e.g., linear combination) and/or a mixture of visual attributes, or may be derived from a combination and/or mixture of visual attributes. By defining a motif (or motifs) for various images, an overall impression of each image may be defined using a combination of visual attributes rather than by isolating a single visual attribute. This may enable images to be compared based on the overall impression, leading to a more robust comparison.

The functional modules 116, 118, and 120 of the image classification system 104 may also include a training module 118 configured to train a machine learning model. The training module 118 may use the images 108, labels 109, and the sets of visual attributes from the attribute module 116 to train the machine learning model. In some embodiments, the training module 118 may use a portion of the documents 107, images 108, and labels 109 (either raw or standardized by the attribute module 116) to generate a set of training data, and may divide the remaining data source 102 information to generate a set of validation data. Based on the training data examples, the training module 118 may train the machine learning algorithm to predict one or more similar images, or to predict one or more similar documents based on similar images.

The functional modules 116, 118, and 120 of the image classification system 104 may further include a similarity module 120 configured to determine one or more images 108 and/or documents 107 that are similar to an anchor image or document using the trained machine learning model. In some embodiments, the trained machine learning model may be used to generate respective embeddings sets for a plurality of images, and relative similarity of images may be determined as a distance between respective embeddings. For example, the similarity module 120 may generate an anchor embeddings set for the anchor image and several candidate embeddings sets for the images that may be candidates for similarity. From there, the similarity module 120 may determine a distance (e.g., Euclidean, etc.) between the anchor embeddings set and each candidate embeddings set, and then may display or otherwise present the candidate image(s) corresponding to the candidate embeddings set(s) closest to the anchor embeddings.

The system 100 may further include a server 130 in electronic communication with the image classification system 104 and with a plurality of user computing devices 106a, 106b, and 106c (which may be referred to individually as a user computing device 106 or collectively as the user computing devices 106). The server 130 may provide a website, data for a mobile application, or other electronic user interface through which the users of the user computing devices 106 may navigate and otherwise interact with the items associated with documents 107. In some embodiments, the server 130 may receive, in response to a user selection, an indication of documents or images similar to the selected document from the image classification system 104, and present one or more documents from the similar documents to the user (e.g., through the interface).

Figure 2:
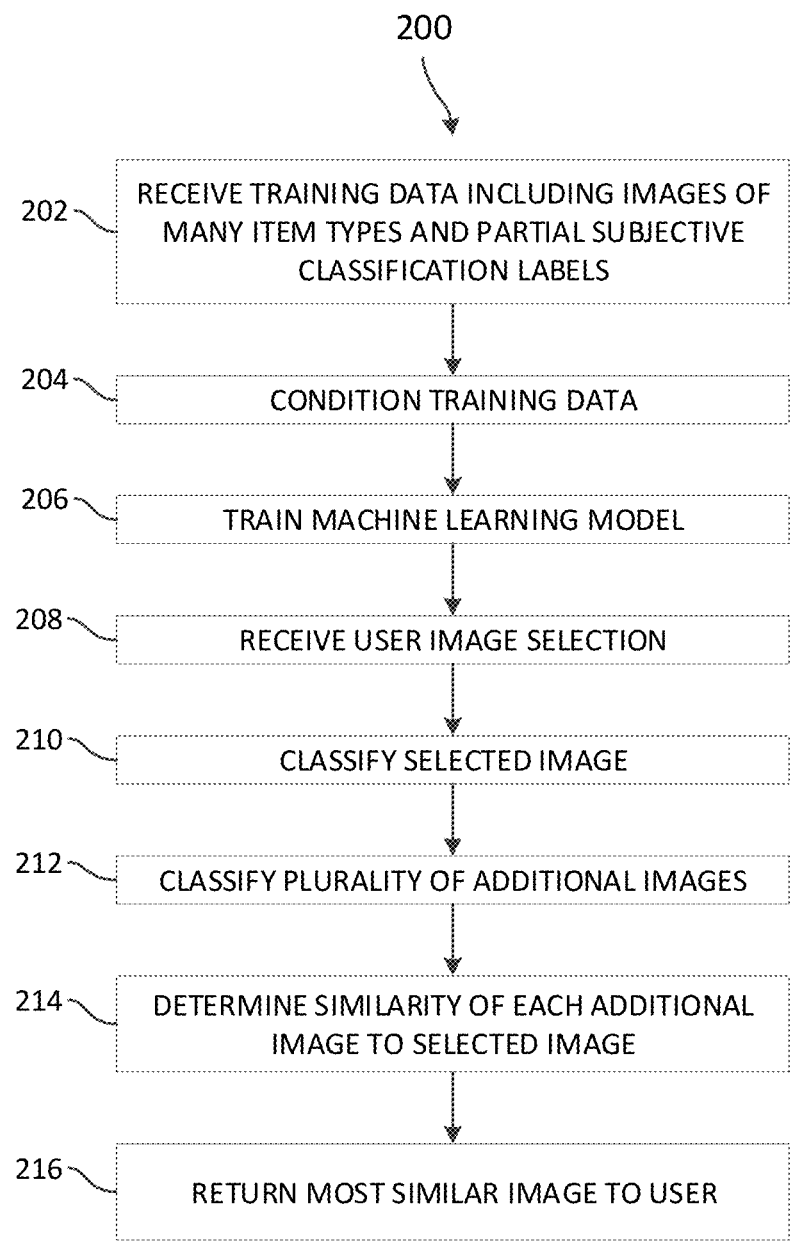
FIG. 2 is a flow chart illustrating an example method for determining similar images based on visual motifs.

FIG. 2 is a flow chart illustrating an example method 200 of classifying one or more images and determining the similarity of two images to each other. One or more portions of the method 200 may be performed by the image classification system 104, in some embodiments.

The method 200 may include, at block 202, receiving training data including images of many types of items and partial classification labels respective of the images. For example, the received training data may include information from the data source 102.

The method 200 may further include, at block 204, conditioning the training data. Such conditioning may include, for example, standardizing the labels of the training data, such that similar terms intended to convey the same classification are made equivalent; flattening the training data labels, such that labels are in a Boolean or other form on which a machine learning model may be trained; and/or unifying syntax of labels, whereby equivalent terms of different syntax (e.g., a plural and singular of the same concept) are made to have equivalent syntax.

The method 200 may further include, at block 206, training a machine learning model (e.g., the trained machine learning model of the similarity module 120) according to the conditioned training data. Block 206 may be performed by the training module 118, and may include training the machine learning model to minimize a loss function, sch as a Binary Cross-Entropy (BCE) loss function according to equations (1) and (2) below:

$$\mathcal{L}_a = -p_a * y_a \log(\sigma(s_a)) - (1 - y_a)\log(1 - \sigma(s_a)) \quad (1)$$

$$\sigma(s_a) = \frac{1}{1 + e^{-s_a}} \quad (2)$$

where $\sigma$ is a Sigmoid activation function, a is an attribute number (e.g., to identify the visual attribute within the determined set from the attribute module 116), s is a predicted label, y is a target label, and p is a modifier based on positive errors. In some embodiments, p may be greater than 1 to penalize false negative predictions more severely than false positives based on an assumption that labels 109 may be more likely to be absent (e.g., not supplied by the document 107 creator) than incorrect (e.g., wrongly applied by the document 107 creator).

The method 200 may further include, at block 208, receiving a user image selection. The user image selection may be or may include, for example, a user selection of a document on an e-commerce website, which document may be associated with one or more images.

The method 200 may further include, at block 210, classifying the image (e.g., anchor image) selected by the user. In some embodiments, block 210 may include inputting the selected image to the machine learning model trained at block 206 to classify the selected image. The machine learning model may generate embeddings respective of the selected image. Accordingly, the classification of the selected image may be or may include embeddings respective of the anchor image.

The method 200 may further include, at block 212, classifying a plurality of additional images. The additional images may be respective of items in a same, similar, and/or different categories to the user-selected image. Block 212 may include, for example inputting each of the plurality of additional images to the machine learning model trained at block 206 to generate respective embeddings for each of the plurality of images. The plurality of additional images may be stored in the images 108, and may be associated with one or more documents 107.

The method 200 may further include, at block 214, determining a similarity each additional image to the selected image. Block 214 may include a mathematical comparison of the embeddings of each of the additional image to the embeddings of the selected image, such as by computing a Euclidean distance, for example.

The method 200 may further include, at block 216, returning the most similar image to the user. The most similar image may be determined as the image corresponding to the embeddings nearest to the embeddings of the selected image. Block 216 may include recommending a document that is the subject of the most similar image to the user in response to the user's selection at block 208.

Figure 3:
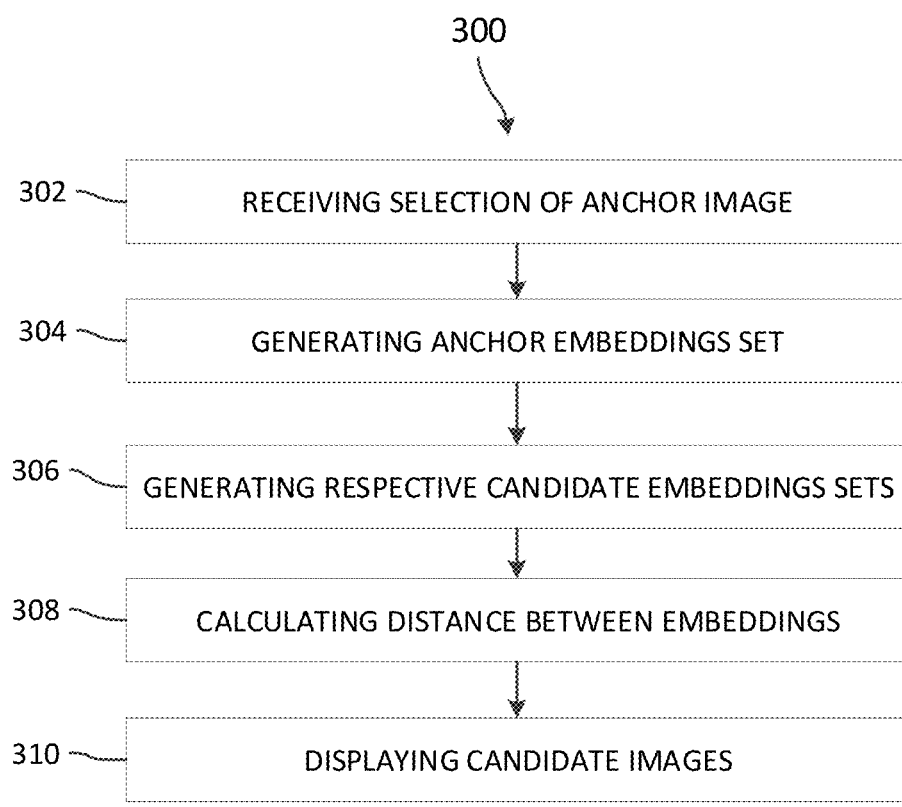
FIG. 3 is a flow chart illustrating an example method of presenting one or more images similar to a user-selected image.

FIG. 3 is a flow chart illustrating an example method 300 of presenting one or more images similar to a user-selected image. One or more portions of the method 300 may be performed by the image classification system 104, in some embodiments.

The method 300 may include, at block 302, receiving a selection of an anchor image from a user (e.g., via user computing device 106). The selection may be directly of an image, such that the user, via an interface, selects a particular image. In some embodiments, the user selection may be of a document, and the anchor image may be derived from (e.g., contained in or otherwise associated with) the selected document. For example, as discussed above with reference to documents 107 and images 108, each document 107 may be associated with one or more images 108, such that an anchor image is derived from the images 108 associated with the selected document. In some embodiments, such as those in which multiple images are associated with the selected document, the anchor image may be determined as the image having an alignment that may be set as the standard alignment. For example, if the selected document is a couch and the associated images include views of the couch from multiple perspectives and angles, the anchor image may be determined to be the image of the couch from the front. This standard alignment may be pre-set for a document or type of document, such that all documents of a particular type (e.g., couch, pillow, etc.) may have a same standard alignment (e.g., all documents classified as couches have the 'front' alignment as standard). The alignment may be a pre-set characteristic of the image (e.g., label 109), or the alignment may be determined using image recognition techniques. For example, a large-scale ontology tree of image types corresponding to a range of visual concepts that include or cover the documents 107 herein (e.g., home goods). If multiple images are determined to each have the standard alignment (e.g., multiple pictures of the front of a couch) and the alignments had been determined using image recognition techniques, the anchor image may be determined as the image with the highest confidence score for the respective alignment determination. In this way, the confidence score for the determination of alignment may be a tiebreaker of sorts.

The method 300 may also include, at block 304, generating an anchor embeddings set indicative of the anchor image. The anchor embeddings set may be generated by a trained machine learning model, such as the trained machine learning model of similarity module 120. In some embodiments, the machine learning model may be a multi-layer classification model that takes an image as an input and outputs an embeddings vector indicative of one or more visual attributes of the image. The final layer of the multi-layer classification model may be a layer that calculates binary values for each of the visual attributes, which may be the flattened attributes from the attribute module 118. By taking the derivation from the penultimate model layer and calculating binary values, the generated anchor embeddings set may itself be indicative of binary values for the visual attributes associated with the anchor image. These binary values, in turn, may be representative of a motif (e.g., combination and/or mixture of visual attributes) of the anchor image.

The method 300 may also include, at block 306, generating candidate embeddings sets indicative of one or more candidate images. The candidate images may be images pulled from the images 108 that may or may not be similar or related to the anchor image. For example, the candidate images may be all images in the images 108 that have a same associated document type to the anchor document, or the candidate images may be all images in the images 108 that have a different associated document type to the anchor document. Similar to the generated embeddings sets at block 304, the candidate embeddings sets may be generated by a trained machine learning model, such as the trained machine learning model of similarity module 120. As described above, the machine learning model may be a multi-layer classification model that takes an image as an input and outputs an embeddings vector indicative of one or more visual attributes of the image. As such, the generated candidate embeddings sets may similarly be indicative of binary values for the visual attributes associated with each candidate image.

The method 300 may also include, at block 308, calculating a distance between the anchor embeddings set and each candidate embeddings set. The distance may be calculated according to a cosine similarity, Euclidean distance, or other appropriate multi-dimensional distance calculation for vectors.

The method 300 may also include, at block 310, displaying one or more candidate images that may be similar to the anchor image based on the calculated distance from block 308. The displayed candidate image(s) may be those image(s) corresponding to the one or more candidate embeddings sets closest to or within a threshold distance of the anchor embeddings set. In some embodiments, the similar candidate image may be displayed, and may include an interactive element that enables a user to navigate to the document associated with the candidate image. In other embodiments, the document associated with the similar candidate image is directly displayed, and may include other interactive elements (e.g., an option to navigate to the document, purchase an item associated with the document, etc.).

Figure 4:
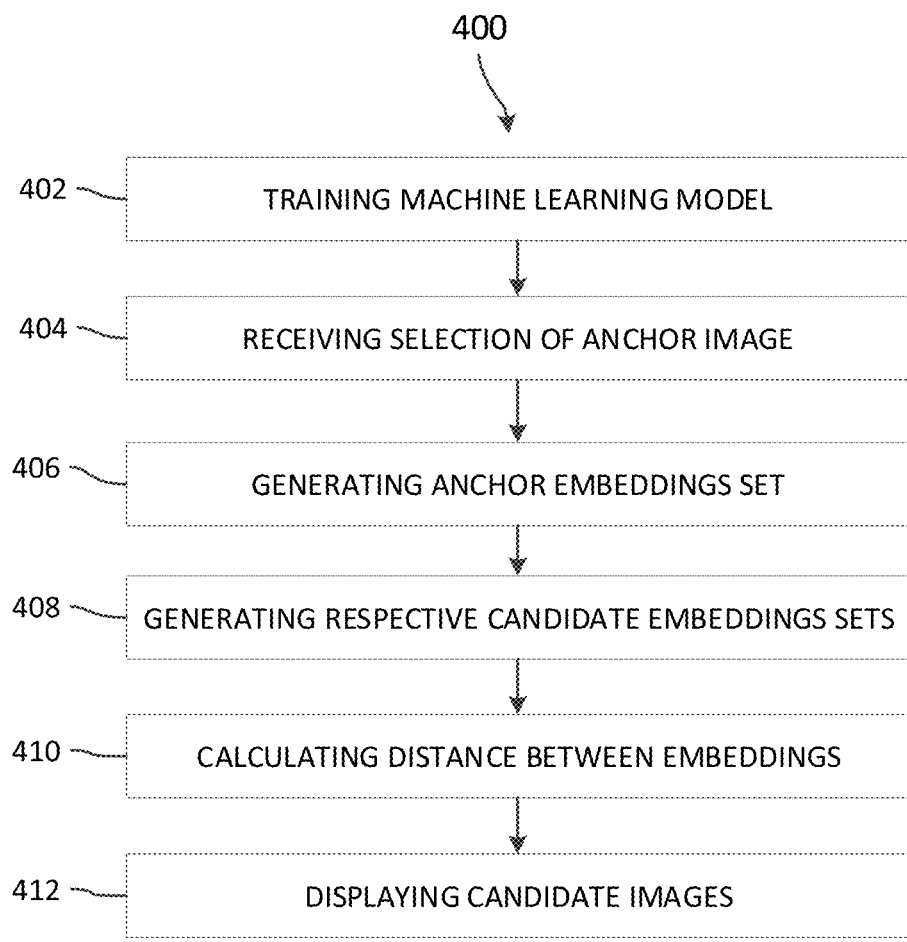
FIG. 4 is a flow chart illustrating an example method of presenting one or more images similar to a user-selected image.

FIG. 4 is a flow chart illustrating an example method 400 of presenting one or more images similar to a user-selected image. One or more portions of the method 400 may be performed by the image classification system 104, in some embodiments.

The method 400 may include, at block 402, training a machine learning model to receive an image as input and output binary values indicative of a plurality of visual attributes of the received image. The plurality of visual attributes may be derived from the labels 109 by standardizing the labels 109, dividing the standardized labels into classes (e.g., style, color, pattern, etc.), and flattening the classes and standardized labels into the plurality of visual attributes. The visual attributes are generated such that a binary value (e.g., yes or no, 1 or 0, etc.) may be indicative of whether an image possesses a particular visual attribute. For example, as discussed above with regard to the attribute module 116, a generated visual attribute may be 'color.red,' where a '1' for an image with regard to this generated visual attribute would indicate that the image (or the document corresponding to the image) may be red.

The machine learning model may be configured to initially generate embeddings for the received image with at least a first layer of the model. The embeddings may be generated in response to training the machine learning model using images (e.g., from the images 108) and labels (e.g., labels 109) associated with the images. As such, the embeddings may be indicative of an image's characteristics relative to the pool of images (e.g., images 108) used to train the machine learning model. A final (e.g., second) layer of the machine learning model may be configured to receive the generated embeddings and to output binary values for the visual attributes based on the generated embeddings. As such, the input image may first be contextualized within a set of images and, based on that contextualization, analyzed for various visual attributes.

The machine learning model may be trained using a cross-entropy loss function in which the loss may be based on the binary values output at the final layer of the machine learning model. This cross-entropy loss function may be the BCE loss function described above with reference to block 206 of method 200. By minimizing the loss of the cross-entropy loss function, the machine learning model may be trained to generate predicted binary values that are relatively close to actual binary values generated for each image in a training data set.

The method 400 may also include, at block 404, receiving a selection of an anchor image from a user (e.g., via user device 106). As discussed above with reference to block 302 of method 300, the selection may be directly of an image, such that the user is, via an interface, selecting a particular image. The selection may also be of a document, and the anchor image may be derived from the selected document. For example, each document 107 may be associated with one or more images 108, such that an anchor image is derived from the images 108 associated with the selected document. In some embodiments, such as those in which multiple images are associated with the selected document, the anchor image may be determined as the image having an alignment that may be set as the standard alignment. For example, if the selected document is a couch and the associated images include views of the couch from multiple perspectives and angles, the anchor image may be determined to be the image of the couch from the front.

The method 400 may also include, at block 406, generating an anchor embeddings set for the anchor image using the machine learning model trained at block 402. Because the machine learning model may be trained to output binary values indicative of visual attributes, the anchor embeddings set from block 406 may include these binary values for the anchor image. In generating the anchor embeddings set, the machine learning model may initially generate a set of intermediate embeddings that may be fed into the final layer of the machine learning model, and the final layer may output the anchor embeddings set.

The method may further include, at block 408, generating respective candidate embeddings set, using the trained machine learning model from block 402, for a set of images that may be candidates for selection and presentation as similar images to the anchor image. These candidate images may be retrieved from the images 108, and may include all images in the images 108 or may include a particular subset of images based on labels (e.g., labels 109) corresponding to the images. For example, the candidate images may be all images that correspond to labels 'area rugs' or 'red.' The candidate embeddings sets may be generated in the same manner as the anchor embeddings sets, such that the machine learning model initially generates an intermediate embeddings in at least a first layer of the model to contextualize the candidate image within a larger set. From there, the model generates the candidate embeddings in a final layer based on the intermediate embeddings. Similar to the anchor embeddings set, the candidate embeddings sets may be indicative of binary values relative to the visual attributes for each candidate image.

The method 400 may also include, at block 410, calculating a distance between the anchor embeddings set and each candidate embeddings set, and, at block 412, displaying one or more candidate images that may be similar to the anchor image based on the calculated distance from block 410. The distance may be calculated according to a cosine similarity, Euclidean distance, or other appropriate multi-dimensional distance calculation for vectors. The displayed candidate image(s) may be those image(s) corresponding to the one or more candidate embeddings sets closest to or within a threshold distance of the anchor embeddings set. In some embodiments, the similar candidate image may be displayed, and may include an interactive element that enables a user to navigate to the document associated with the candidate image. In other embodiments, the document associated with the similar candidate image is directly displayed, and may include other interactive elements (e.g., an option to purchase the document).

Figure 5:
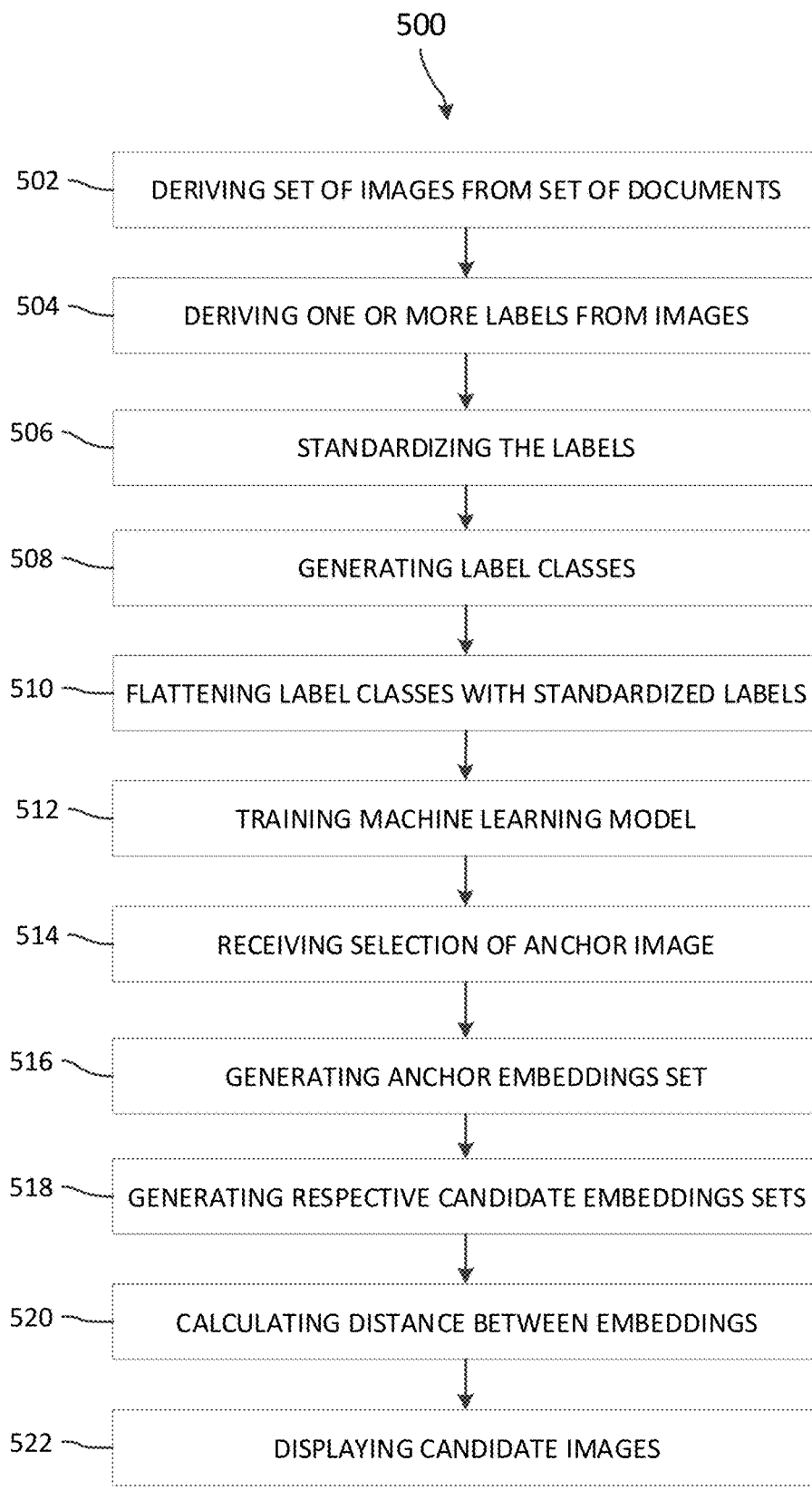
FIG. 5 is a flow chart illustrating an example method of presenting one or more images similar to a user-selected image.

FIG. 5 is a flow chart illustrating an example method 500 of presenting one or more images similar to a user-selected image. One or more portions of the method 500 may be performed by the image classification system 104, in some embodiments.

The method 500 may include, at block 502, deriving a set of images from a set of documents. These images may be images 108, and these documents may be documents 107 of FIG. 1. When multiple images are associated with a single document, a single image for use with the method 500 may be selected by determining an alignment of each of the multiple images and selecting the image (or images) that have an alignment that matches with a standard alignment. For example, if the selected document is a couch and the associated images include views of the couch from multiple perspectives and angles, the selected image may be determined to be the image of the couch from the front. This standard alignment may be pre-set for a document or type of document, such that all documents of a particular type (e.g., couch, pillow, etc.) may have a same standard alignment (e.g., all documents classified as couches have the 'front' alignment as standard). The alignment may be a pre-set characteristic of the image (e.g., label 109), or the alignment may be determined using image recognition techniques. If multiple images are determined to each have the standard alignment (e.g., multiple pictures of the front of a couch) and the alignments had been determined using image recognition techniques, the selected image may be determined as the image with the highest confidence score for the respective alignment determination. In this way, the confidence score for the determination of alignment may be a tiebreaker of sorts.

The method 500 may also include, at block 504, deriving pre-determined labels from each image derived at block 502 and, at block 506, standardizing the labels. These labels may be labels 109 of FIG. 1, and deriving the labels may include associating each image with corresponding labels from labels 109. The labels may be standardized by consolidating or revising each label based on a root word(s). By focusing on the root words, the syntax for the derived labels may be unified, such that there may be consistency across the set of labels. For example, 'ruby red' and 'reds' may both be standardized as 'red.' This standardization may be performed by a word processing tool, or by a machine learning model trained to recognize root words.

The method 500 may further include, at block 508, generating label classes based on the standardized labels from block 506, and, at block 510, flattening the label classes with the standardized labels to generate a defined set of visual attributes. The label classes may be overarching categories that capture sets of labels, such that the label classes may be indicative of a universal visual description. For example, 'red' and 'blue' may be included in a 'color' class, while 'round' and 'trapezoid' may be included in a 'shape' class. From there, the label classes may be flattened with the standardized labels to generate, for each standardized label, a single attribute that may carry a binary value indicative of whether or not the attribute is present. For example, 'red' and 'blue' may be flattened to 'color.red' and 'color.blue' respectively. Because each visual attribute may carry a binary value, an image can be described by a string of binary values (e.g., 1 or 0) corresponding to the determined visual attributes.

The method 500 may include, at block 512, training a machine learning model to receive an image and output binary values indicative, for the received image, of the visual attributes determined at block 510. As described above with reference to block 402 of method 400, the machine learning model may be configured to initially generate embeddings for the received image with at least a first layer of the model. The embeddings may be generated in response to training the machine learning model using images (e.g., from the images 108) and labels (e.g., labels 109) associated with the images. As such, the embeddings may be indicative of an image's characteristics relative to the pool of images (e.g., images 108) used to train the machine learning model. A final (e.g., second) layer of the machine learning model may be configured to receive the generated embeddings and to output binary values for the visual attributes based on the generated embeddings.

The machine learning model may be trained using a cross-entropy loss function in which the loss may be based on the binary values output at the final layer of the machine learning model. This cross-entropy loss function may be the BCE loss function described above with reference to block 206 of method 200. By minimizing the loss of the cross-entropy loss function, the machine learning model may be trained to generate predicted binary values that are relatively close to actual binary values generated for each image in a training data set.

The method 500 may also include, at block 514, receiving a selection of an anchor image from a user (e.g., via user device 106). As discussed above with reference to block 302 of method 300 and block 404 of method 400, the selection may be directly of an image, such that the user is, via an interface, selecting a particular image. The selection may also be of a document, and the anchor image may be derived from the selected document. For example, each document 107 may be associated with one or more images 108, such that an anchor image is derived from the images 108 associated with the selected document. In some embodiments, such as those in which multiple images are associated with the selected document, the anchor image may be determined as the image having an alignment that may be set as the standard alignment. For example, if the selected document is a couch and the associated images include views of the couch from multiple perspectives and angles, the anchor image may be determined to be the image of the couch from the front.

The method 500 may also include, at block 516, generating an anchor embeddings set for the anchor image using the machine learning model trained at block 512. Because the machine learning model may be trained to output binary values indicative of visual attributes, the anchor embeddings set from block 516 may be indicative of these binary values for the anchor image. In generating the anchor embeddings set, the machine learning model may initially generate a set of intermediate embeddings that may be fed into the final layer of the machine learning model, and the final layer may output the anchor embeddings set.

The method may further include, at block 518, generating respective candidate embeddings set, using the trained machine learning model from block 512, for a set of images that may be candidates for selection and presentation as similar images to the anchor image. These candidate images may be retrieved from the images 108, and may include all images in the images 108 or may include a particular subset of images based on labels (e.g., labels 109) corresponding to the images. For example, the candidate images may be all images that correspond to labels 'area rugs' or 'red.' The candidate embeddings sets may be generated in the same manner as the anchor embeddings sets, such that the machine learning model initially generates an intermediate embeddings in at least a first layer of the model to contextualize the candidate image within a larger set. From there, the model generates the candidate embeddings in a final layer based on the intermediate embeddings. Similar to the anchor embeddings set, the candidate embeddings sets may be indicative of binary values relative to the visual attributes for each candidate image.

The method 500 may also include, at block 520, calculating a distance between the anchor embeddings set and each candidate embeddings set, and, at block 522, displaying one or more candidate images that may be similar to the anchor image based on the calculated distance from block 520. The distance may be calculated according to a cosine similarity, Euclidean distance, or other appropriate multi-dimensional distance calculation for vectors. The displayed candidate image(s) may be those image(s) corresponding to the one or more candidate embeddings sets closest to or within a threshold distance of the anchor embeddings set. In some embodiments, the similar candidate image may be displayed, and may include an interactive element that enables a user to navigate to the document associated with the candidate image. In other embodiments, the document associated with the similar candidate image is directly displayed, and may include other interactive elements (e.g., an option to purchase the document).

The systems and methods described herein may provide many benefits over traditional image processing systems. For example, the methods described herein first contextualize an image with a larger global set of images before applying labels to the image, which provides a more robust and accurate image classification. Additionally, by generating attributes that can correspond to a single binary value rather than plaintext or other word-based labels, an image can be described by a string of digits. Not only does this save memory space and improve processing as a result, but this also allows for better image classification, as it removes much of the subjective nature typically inherent in determining whether two (or more) images are similar. Furthermore, the binary labels enable a machine learning model to be trained to classify images, as traditional plaintext-based image labeling does not work well with machine learning models. By leveraging machine learning models, these methods may provide a more accurate and less human-intensive image classification process. For example, in testing the methods described herein, the machine learning model aspects led to greatly improved image recognition and, subsequently, responses from users.

Figure 6:
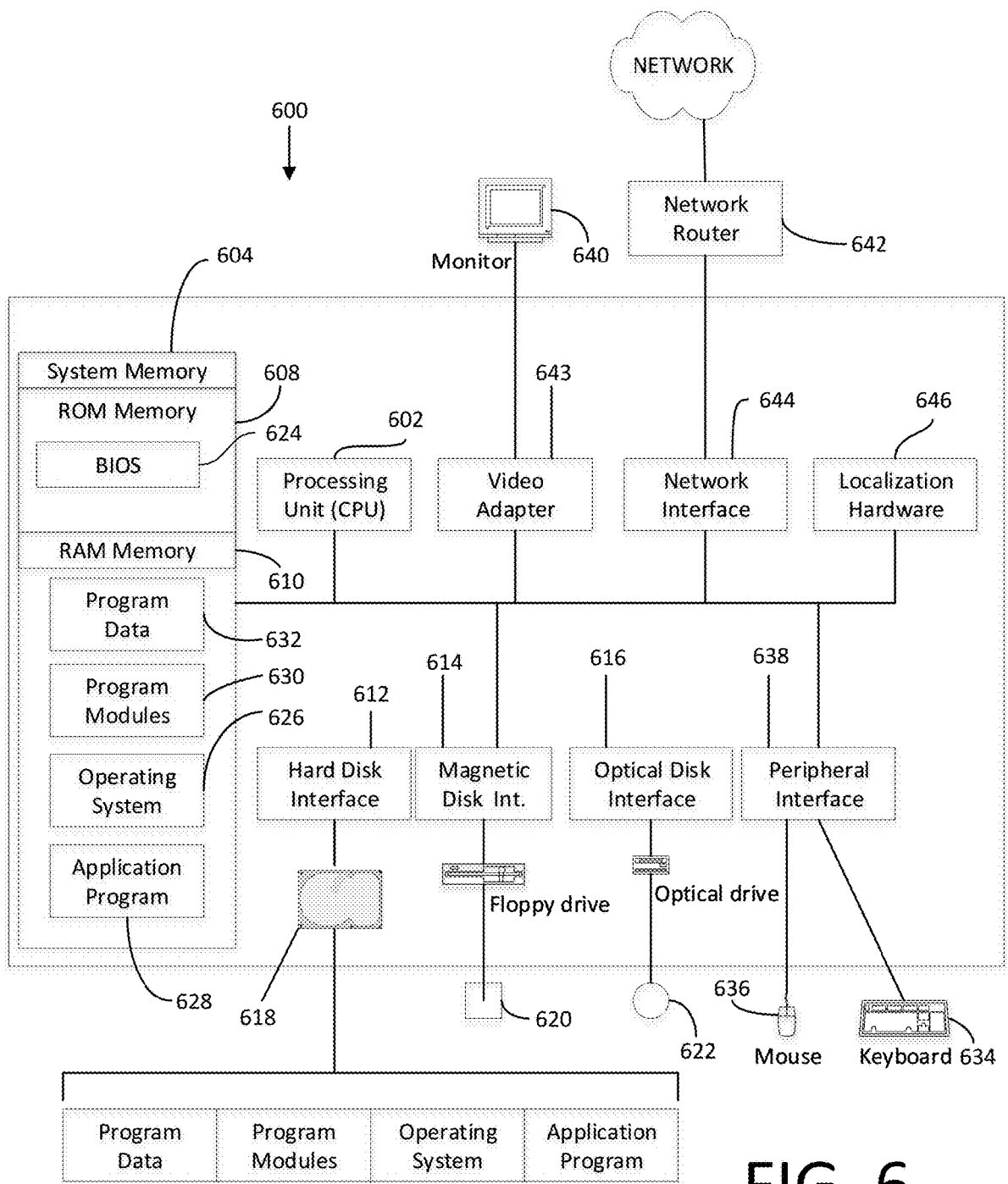
FIG. 6 is a diagrammatic view of an example user computing environment.

FIG. 6 is a diagrammatic view of an example embodiment of a user computing environment that includes a computing system environment 600, such as a desktop computer, laptop, smartphone, tablet, or any other such device having the ability to execute instructions, such as those stored within a non-transient, computer-readable medium. Furthermore, while described and illustrated in the context of a single computing system, those skilled in the art will also appreciate that the various tasks described hereinafter may be practiced in a distributed environment having multiple computing systems linked via a local or wide-area network in which the executable instructions may be associated with and/or executed by one or more of multiple computing systems.

In its most basic configuration, computing system environment 600 typically includes at least one processing unit 602 and at least one memory 604, which may be linked via a bus. Depending on the exact configuration and type of computing system environment, memory 604 may be volatile (such as RAM 610), non-volatile (such as ROM 608, flash memory, etc.) or some combination of the two. Computing system environment 600 may have additional features and/or functionality. For example, computing system environment 600 may also include additional storage (removable and/or non-removable) including, but not limited to, magnetic or optical disks, tape drives and/or flash drives. Such additional memory devices may be made accessible to the computing system environment 600 by means of, for example, a hard disk drive interface 612, a magnetic disk drive interface 614, and/or an optical disk drive interface 616. As will be understood, these devices, which would be linked to the system bus, respectively, allow for reading from and writing to a hard disk 618, reading from or writing to a removable magnetic disk 620, and/or for reading from or writing to a removable optical disk 622, such as a CD/DVD ROM or other optical media. The drive interfaces and their associated computer-readable media allow for the nonvolatile storage of computer readable instructions, data structures, program modules and other data for the computing system environment 600. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 600.

A number of program modules may be stored in one or more of the memory/media devices. For example, a basic input/output system (BIOS) 624, containing the basic routines that help to transfer information between elements within the computing system environment 600, such as during start-up, may be stored in ROM 608. Similarly, RAM 610, hard disk 618, and/or peripheral memory devices may be used to store computer executable instructions comprising an operating system 626, one or more applications programs 628 (which may include the functionality of the image classification system 104 of FIG. 1 or one or more of its functional modules 116, 118, 120, for example), other program modules 630, and/or program data 632. Still further, computer-executable instructions may be downloaded to the computing environment 600 as needed, for example, via a network connection.

An end-user may enter commands and information into the computing system environment 600 through input devices such as a keyboard 634 and/or a pointing device 636. While not illustrated, other input devices may include a microphone, a joystick, a game pad, a scanner, etc. These and other input devices would typically be connected to the processing unit 602 by means of a peripheral interface 638 which, in turn, would be coupled to bus. Input devices may be directly or indirectly connected to processor 602 via interfaces such as, for example, a parallel port, game port, firewire, or a universal serial bus (USB). To view information from the computing system environment 600, a monitor 640 or other type of display device may also be connected to bus via an interface, such as via video adapter 643. In addition to the monitor 640, the computing system environment 600 may also include other peripheral output devices, not shown, such as speakers and printers.

The computing system environment 600 may also utilize logical connections to one or more computing system environments. Communications between the computing system environment 600 and the remote computing system environment may be exchanged via a further processing device, such a network router 642, that is responsible for network routing. Communications with the network router 642 may be performed via a network interface component 644. Thus, within such a networked environment, e.g., the Internet, World Wide Web, LAN, or other like type of wired or wireless network, it will be appreciated that program modules depicted relative to the computing system environment 600, or portions thereof, may be stored in the memory storage device(s) of the computing system environment 600.

The computing system environment 600 may also include localization hardware 646 for determining a location of the computing system environment 600. In embodiments, the localization hardware 646 may include, for example only, a GPS antenna, an RFID chip or reader, a WiFi antenna, or other computing hardware that may be used to capture or transmit signals that may be used to determine the location of the computing system environment 600.

The computing environment 600, or portions thereof, may comprise one or more components of the system 100 of FIG. 1, in embodiments.

In some embodiments, a method includes receiving, by a server system from a user, a selection of an anchor image, generating, by the server system using a machine learning model, an anchor embeddings set for the anchor image, the anchor embeddings set indicative of binary values associated with the anchor image for a set of visual attributes, generating, by the server system, using the machine learning model, respective candidate embeddings sets for a plurality of candidate images, calculating a distance between the anchor embeddings set and each of the plurality of candidate embeddings sets, and displaying at least one of the plurality of candidate images based on the calculated distance.

In some of these embodiments, receiving the selection of the anchor image includes receiving, by the server system from the user, a selection of an anchor document, and deriving the anchor image from the anchor document by retrieving a set of images associated with the anchor document, determining an alignment of each image in the set of images, receiving an indication of a standard alignment, and selecting, as the anchor image, the image in the set of images having the standard alignment. In some of these embodiments, the indication of the standard alignment is based on a document type of the anchor document. In other of these embodiments, deriving the anchor image further includes determining that two or more images of the set of images have the standard alignment, determining a confidence score associated with the alignment determination for each of the two or more images, and selecting the anchor image as the image of the two or more images with a highest confidence score.

In some of these embodiments, the displayed at least one candidate image corresponds to the candidate embeddings set that is closest to the anchor embeddings set. In some of these embodiments, each candidate embeddings set is indicative of binary values associated with each candidate image for the set of visual attributes. In some of these embodiments, the binary values represent a motif for each candidate image. The motif may be a combination of visual attributes.

In other embodiments, a method includes training a machine learning model to receive an input image and to output binary values for a plurality of visual attributes of the input image, receiving, by a server system from a user, a selection of an anchor image, generating, by the server system using the machine learning model, an anchor embeddings set for the anchor image, generating, by the machine learning model, respective candidate embeddings sets for a plurality of candidate images, each candidate embeddings set associated with a candidate image, calculating a distance between the anchor embeddings set and each of the plurality of candidate embeddings sets, and displaying at least one of the plurality of candidate images based on the calculated distance.

In some of these embodiments, the machine learning model generates embeddings for an image with a first layer of the model that, during training, is input to a second layer that outputs the binary values for the plurality of visual attributes of the image. In other of these embodiments, training the machine learning model includes minimizing a cross-entropy loss function, wherein a loss of the loss function includes a sum of losses respective of the binary values for the plurality of visual attributes.

In some of these embodiments, the plurality of visual attributes are generated by defining a set of images, each image associated with a document, deriving, from each image of the set of images, one or more pre-determined labels, standardizing the one or more pre-determined labels, generating label classes based on the standardized labels, and flattening the label classes with the pre-determined labels to generate the set of visual attributes. In some of these embodiments, flattening includes consolidating the one or more standardized labels and the label classes into the set of visual attributes, wherein each visual attribute includes at least one label class and at least one standardized label, and wherein the binary value for each visual attribute is indicative of an image associated with the binary value having the visual attribute.

In some of these embodiments, receiving the selection of the anchor image includes receiving, by the server system from the user, a selection of an anchor document, and deriving the anchor image from the anchor document by retrieving a set of images associated with the anchor document, determining an alignment of each image in the set of images, receiving an indication of a standard alignment, and selecting, as the anchor image, the image in the set of images having the standard alignment.

In some of these embodiments, the displayed at least one candidate image corresponds to the candidate embeddings set closest to the anchor embeddings set. In other of these embodiments, displaying the at least one candidate image includes displaying a candidate document associated with each of the at least one candidate image.

In some embodiments, a method includes deriving a set of images from a set of documents, deriving, from each image of the set of images, one or more pre-determined labels, standardizing the one or more pre-determined labels, generating label classes based on the standardized labels, and flattening the label classes with the standardized labels to generate a defined set including a plurality of visual attributes, training a machine learning model to receive an input image and to output binary values for the plurality of visual attributes of the input image, receiving, by a server system from a user, a selection of an anchor image, generating, by the server system using a machine learning model, an anchor embeddings set for the anchor image, the anchor embeddings set indicative of binary values associated with the anchor image for the set of visual attributes, generating, by server system using the machine learning model, respective candidate embeddings sets for a plurality of candidate images, each candidate embeddings set indicative of binary values associated with each candidate image for the set of visual attributes, calculating a distance between the anchor embeddings set and each of the plurality of candidate embeddings sets, and displaying at least one of the plurality of candidate images based on the calculated distance.

In some of these embodiments, flattening includes consolidating the one or more standardized labels and the label classes into the set of visual attributes, wherein each visual attribute includes at least one label class and at least one standardized label, and wherein the binary value for each visual attribute is indicative of an image associated with the binary value having the visual attribute.

In some of these embodiments, receiving the selection of the anchor image includes receiving, by the server system from the user, a selection of an anchor document, and deriving the anchor image from the anchor document by retrieving a set of images associated with the anchor document, determining an alignment of each image in the set of images, receiving an indication of a standard alignment, and selecting, as the anchor image, the image in the set of images having the standard alignment. In some of these embodiments, deriving the anchor image further includes determining that two or more images of the set of images have the standard alignment, determining a confidence score associated with the alignment determination for each of the two or more images, and selecting the anchor image as the image of the two or more images with a highest confidence score.

In some of these embodiments, displaying the at least one candidate image includes displaying a candidate document associated with each of the at least one candidate image.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result.

The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A method comprising:
   receiving, by a server system from a user, a selection of an anchor image;
   generating, by the server system using a machine learning model, an anchor embeddings set for the anchor image, wherein the machine learning model is trained to receive an input image and output binary values for a plurality of visual attributes of the input image, the binary value for each visual attribute is indicative of an image associated with the binary value having the visual attribute, the visual attribute includes a consolidation of at least one standardized label derived from the image and at least one label class derived from the standardized labels, and the anchor embeddings set is indicative of binary values associated with the anchor image for a set of visual attributes;
   generating, by the server system, using the machine learning model, respective candidate embeddings sets for a plurality of candidate images;
   calculating a distance between the anchor embeddings set and each of the plurality of candidate embeddings sets; and
   displaying at least one of the plurality of candidate images based on the calculated distance.

2. The method of claim 1, wherein receiving the selection of the anchor image comprises:
   receiving, by the server system from the user, a selection of an anchor document; and
   deriving the anchor image from the anchor document by:
      retrieving a set of images associated with the anchor document;
      determining an alignment of each image in the set of images;
      receiving an indication of a standard alignment; and
      selecting, as the anchor image, the image in the set of images having the standard alignment.

3. The method of claim 2, wherein the indication of the standard alignment is based on a document type of the anchor document.

4. The method of claim 2, wherein deriving the anchor image further comprises:
   determining that two or more images of the set of images have the standard alignment;
   determining a confidence score associated with the alignment determination for each of the two or more images; and
   selecting the anchor image as the image of the two or more images with a highest confidence score.

5. The method of claim 1, wherein the displayed at least one candidate image corresponds to the candidate embeddings set that is closest to the anchor embeddings set.

6. The method of claim 1, wherein each candidate embeddings set is indicative of binary values associated with each candidate image for the set of visual attributes.

7. The method of claim 6, wherein the binary values represent a motif for each candidate image, the motif comprising a combination of visual attributes.

8. A method comprising:
   training a machine learning model to receive an input image and to output binary values for a plurality of visual attributes of the input image, wherein the binary value for each visual attribute is indicative of an image associated with the binary value having the visual attribute, and the visual attribute includes a consolidation of at least one standardized label derived from the image and at least one label class derived from the standardized labels;
   receiving, by a server system from a user, a selection of an anchor image;
   generating, by the server system using the machine learning model, an anchor embeddings set for the anchor image;
   generating, by the machine learning model, respective candidate embeddings sets for a plurality of candidate images, each candidate embeddings set associated with a candidate image;
   calculating a distance between the anchor embeddings set and each of the plurality of candidate embeddings sets; and
   displaying at least one of the plurality of candidate images based on the calculated distance.

9. The method of claim 8, wherein the machine learning model generates embeddings for an image with a first layer of the model that, during training, is input to a second layer that outputs the binary values for the plurality of visual attributes of the image.

10. The method of claim 8, wherein training the machine learning model comprises minimizing a cross-entropy loss function, wherein a loss of the loss function comprises a sum of losses respective of the binary values for the plurality of visual attributes.

11. The method of claim 8, wherein the plurality of visual attributes are generated by:
    defining a set of images, each image associated with a document;
    deriving, from each image of the set of images, one or more pre-determined labels;
    standardizing the one or more pre-determined labels;
    generating label classes based on the standardized labels; and flattening the label classes with the pre-determined labels to generate the set of visual attributes.

12. The method of claim 8, wherein receiving the selection of the anchor image comprises:
   receiving, by the server system from the user, a selection of an anchor document; and
   deriving the anchor image from the anchor document by:
      retrieving a set of images associated with the anchor document;
      determining an alignment of each image in the set of images;
      receiving an indication of a standard alignment; and
      selecting, as the anchor image, the image in the set of images having the standard alignment.

13. The method of claim 8, wherein the displayed at least one candidate image corresponds to the candidate embeddings set closest to the anchor embeddings set.

14. The method of claim 8, wherein displaying the at least one candidate image comprises displaying a candidate document associated with each of the at least one candidate image.

15. A method comprising:
   deriving a set of images from a set of documents;
   deriving, from each image of the set of images, one or more pre-determined labels;
   standardizing the one or more pre-determined labels;
   generating label classes based on the standardized labels;
   flattening the label classes with the standardized labels to generate a defined set comprising a plurality of visual attributes, wherein flattening comprises consolidating the standardized labels and the label classes into the set of visual attributes, and each visual attribute comprises at least one label class and at least one standardized label;
   training a machine learning model to receive an input image and to output binary values for the plurality of visual attributes of the input image, wherein the binary value for each visual attribute is indicative of an image associated with the binary value having the visual attribute;
   receiving, by a server system from a user, a selection of an anchor image;
   generating, by the server system using a machine learning model, an anchor embeddings set for the anchor image, the anchor embeddings set indicative of binary values associated with the anchor image for the set of visual attributes;
   generating, by server system using the machine learning model, respective candidate embeddings sets for a plurality of candidate images, each candidate embeddings set indicative of binary values associated with each candidate image for the set of visual attributes;
   calculating a distance between the anchor embeddings set and each of the plurality of candidate embeddings sets; and
   displaying at least one of the plurality of candidate images based on the calculated distance.

16. The method of claim 15, wherein receiving the selection of the anchor image comprises:
   receiving, by the server system from the user, a selection of an anchor document; and
   deriving the anchor image from the anchor document by:
      retrieving a set of images associated with the anchor document;
      determining an alignment of each image in the set of images;
      receiving an indication of a standard alignment; and
      selecting, as the anchor image, the image in the set of images having the standard alignment.

17. The method of claim 16, wherein deriving the anchor image further comprises:
   determining that two or more images of the set of images have the standard alignment;
   determining a confidence score associated with the alignment determination for each of the two or more images; and
   selecting the anchor image as the image of the two or more images with a highest confidence score.

18. The method of claim 15, wherein displaying the at least one candidate image comprises displaying a candidate document associated with each of the at least one candidate image.

* * * * *